United States Patent [19]

Kerrebrock et al.

[11] Patent Number: 5,372,617
[45] Date of Patent: Dec. 13, 1994

[54] HYDROGEN GENERATION BY HYDROLYSIS OF HYDRIDES FOR UNDERSEA VEHICLE FUEL CELL ENERGY SYSTEMS

[75] Inventors: Peter A. Kerrebrock, Attleboro; A. Steven Wayne, Malden, both of Mass.

[73] Assignee: The Charles Stark Draper Laboratory, Inc., Cambridge, Mass.

[21] Appl. No.: 69,097

[22] Filed: May 28, 1993

[51] Int. Cl.$^5$ .............. B01F 3/12; B01F 7/04; B01F 7/08; B01F 7/14
[52] U.S. Cl. .............. 48/61; 48/189.2; 48/189.5; 366/169; 366/310; 366/325; 366/288; 422/225; 422/229
[58] Field of Search .............. 48/197 R, 204, 61, 101, 48/189.2, 189.5, 85.2; 422/144, 146, 140, 200, 225, 229, 305; 423/286, 646, 657, 658.2; 366/288, 169, 325, 310; 123/3

[56] References Cited

U.S. PATENT DOCUMENTS

| | | | |
|---|---|---|---|
| 1,106,736 | 8/1914 | Schuler | 366/169 X |
| 1,763,122 | 6/1930 | Bailey | 366/169 X |
| 2,587,127 | 2/1952 | Erickson et al. | 366/310 X |
| 2,861,786 | 11/1958 | Madsen | 366/169 X |
| 3,210,157 | 10/1965 | Lewis | 423/648.1 |
| 3,458,288 | 7/1969 | Lafyatis | 422/113 |
| 3,649,360 | 3/1972 | Bloomfield et al. | 423/657 |
| 3,855,404 | 12/1974 | Rotaru | 422/225 X |
| 4,107,282 | 8/1978 | Christopher | 423/657 |
| 4,249,654 | 2/1981 | Heleversen | 423/658.2 X |
| 4,261,955 | 4/1981 | Bailey, Jr. et al. | 48/61 X |
| 4,284,900 | 8/1981 | Botts | 290/43 |
| 4,302,217 | 11/1981 | Teital | 123/3 X |
| 4,335,093 | 6/1982 | Salomon | 423/644 |
| 5,141,823 | 8/1992 | Wright et al. | 429/19 |

*Primary Examiner*—Robert J. Warden
*Assistant Examiner*—Robert Carpenter
*Attorney, Agent, or Firm*—Weingarten, Schurgin, Gagnebin & Hayes

[57] ABSTRACT

A hydrogen generator for hydrolyzing hydrides substantially at stoichiometry to provide hydrogen on demand to a fuel cell is disclosed. The generator comprises a sealable, pressurizable, thermally insulated vessel into which a hydride in granular form is loaded. Water, most of which may be a byproduct from the fuel cell, is controllably introduced into the vessel for reaction with the hydride to generate hydrogen. The rate of introduction of the water is determined by the demand for hydrogen at the fuel cell. Heat transfer apparatus is disposed about the vessel to control the temperature of the reaction. A stirring mechanism is disposed in the vessel to prevent clumping of the hydride, to distribute the water to unreacted hydride, and to disperse the heat of the reaction throughout the hydride mass and thence to the heat transfer apparatus. An outlet from the vessel is provided for transfer of the generated hydrogen to the fuel cell. The system is particularly suitable for use in closed systems such as undersea vehicles.

69 Claims, 5 Drawing Sheets

HYDROGEN GENERATION BY HYDROLYSIS OF HYDRIDES FOR UNDERSEA VEHICLE FUEL CELL ENERGY SYSTEMS

FIELD OF THE INVENTION

This invention relates to hydrogen generation systems and more particularly to a system of generating hydrogen for use in fuel cells for undersea vehicles.

BACKGROUND OF THE INVENTION

Energy systems used to power unmanned undersea vehicles (UUVs) have unique requirements. Undersea vehicles are closed systems; all power generation equipment and fuel must be stored within the vehicle for the duration of the underwater voyage. Thus, minimizing the weight, volume, and parasitic power requirements of the fuels and associated hardware is essential, especially in small vehicles. Also, unmanned undersea vehicles generally travel at low speeds, so they cannot generate substantial hydrodynamic lift. Therefore, these vehicles need to maintain neutral buoyancy, proper center of buoyancy/center of gravity separation, and longitudinal and transverse trim. However, maintaining vehicle balance is difficult with open cycle systems which pump in seawater for purposes such as providing reactant and reaction product waste disposal, in which the volume of water in and out varies. Additionally, an energy system in an undersea vehicle must be operable at various orientations or angles of pitch and roll.

Unmanned undersea vehicles are typically powered by batteries. However, fuel cell power systems have been developed to the point where they may soon become a viable alternative power source to batteries. Fuel cells convert the chemical energy of a fuel and oxidizer into electricity by electrochemical reactions. For example, in some types of fuel cells, externally supplied hydrogen, $H_2$, and oxygen, $O_2$, are converted into water and energy. Proton exchange membrane (PEM) fuel cells, which use $H_2$ and $O_2$, are emerging as a likely replacement for batteries as an efficient power source for undersea vehicles. PEM fuel cells have a high efficiency at low temperatures and pressures, have no liquid electrolyte, and can operate at high power densities. Also, PEM fuel cell technology is sufficiently well developed to provide a viable power source for UUVs.

However, all fuel cells require external reactant supplies. That is, all the fuel and oxidizer, such as hydrogen and oxygen, to be used by a fuel cell during a voyage of an undersea vehicle must be stored and/or generated in the vehicle. Thus, to maximize the specific energy and energy density, it is necessary to minimize the volume and mass of the reactants to be stored.

Hydrogen can be stored as a liquid in a cryogenic tank. However, cryogenic tank storage of liquid hydrogen (LH2) has disadvantages. LH2 has a low weight, but it also has a low specific gravity, which results in a disproportionately large volume. Also, LH2 is dangerous. The risk of boiloff is significant, particularly in an undersea vehicle. Thus, alternate methods of storing or generating hydrogen are needed before fuel cells can become a viable power source for undersea vehicles.

Hydrogen can be generated by the reaction of various hydrides with water, known as hydrolysis. A typical reaction is the following:

$$M_xH_y + zH_2O \rightarrow M_x(OH)_z + (z/2 + y/2)H_2.$$

M denotes one or more metals bonded to the hydrogen to form the hydride. The reaction is exothermic. Table 1 lists a variety of hydrides and the hydrolysis reaction associated with each hydride.

TABLE 1

| Hydride | Reaction |
|---|---|
| Diborane | $B_2H_6 + 6H_2O \rightarrow 2H_3BO_3 + 6H_2$ |
| Lithium Borohydride | $LiBH_4 + 2H_2O \rightarrow LiBO_2 + 4H_2$ |
| Lithium Hydride | $LiH + H_2O \rightarrow LiOH + H_2$ |
| Trisilane | $Si_3H_8 + 6H_2O \rightarrow 3SiO_2 + 10H_2$ |
| Sodium Borohydride | $NaBH_4 + 2H_2O \rightarrow NaBO_2 + 4H_2$ |
| Lithium Aluminum Hydride | $LiAlH_4 + 5/2H_2O \rightarrow LiOH + \frac{1}{2}Al_2O_3 + 4H_2$ |
| Magnesium Hydride | $MgH_2 + 2H_2O \rightarrow Mg(OH)_2\ 2H_2$ |
| Calcium Hydride | $CaH_2 + 2H_2O \rightarrow Ca(OH)_2 + 2H_2$ |
| Sodium Hydride | $NaH + H_2O \rightarrow NaOH + H_2$ |

Hydrids are routinely hydrolyzed to generate hydrogen for applications ranging from filling weather balloons to providing laboratory gas supplies. In conventional methods, a measured amount of hydride is introduced into water. The water is provided in excess of the stoichiometric amount of water needed for the hydrolysis reaction to occur. This excess of water renders such methods unsuitable for use in UUVs, where there is no room for the storage of this excess water.

In another known hydrogen generator, the Kipp Generator, a column of hydride is inverted in water, such that some water enters the bottom of the column and reacts with the hydride there. Hydrogen generated in the reaction rises to the top of the column where it is removed through a control valve. The water level in the column, and hence the reaction rate, is controlled by controlling the pressure exerted by the hydrogen over the column. The column must remain in an upright orientation, however, for the reaction to remain controllable. Tilting of the column, such as would occur in undersea vehicles, would tilt the water level relative to the hydrides in the column, causing unwanted reactions as the water contacted the unreacted hydrides.

In an additional known method for generating hydrogen, a humidified gas is blown through a bed of hydride to distribute water vapor. However, the power required to blow gas through the bed of hydride may, in some instances, be excessive, and the noise of the blower may, in some applications, be undesirable. In a further known method, a reaction vessel is provided having a wick disposed therein to transport water to unreacted hydride. However, control of the reaction rate is difficult with this method. Thus, these systems of generating hydrogen are not suitable for use in undersea vehicles.

SUMMARY OF THE INVENTION

The present invention provides a hydrogen generator suitable for use in an undersea vehicle powered by a fuel cell. The generator is capable of supplying hydrogen gas on demand to the fuel cell. The generator comprises a closed, pressurizable, thermally insulated vessel having a cylindrical chamber with domed ends. The vessel is loaded with hydride in a loose granular or pelletized form. Suitable hydrides are lithium borohydride, $LiBH_4$, calcium hydride, $CaH_2$, and lithium hydride, $LiH$. A blend of hydrides may also be used. A stirring apparatus disposed in the vessel continually stirs the hydride. Water, either liquid or steam, is controllably introduced into the vessel through injection nozzles for reaction with the hydride in the vicinity of the nozzles. The rate of introduction of the water is determined by the demand for hydrogen at the fuel cell. Hydrogen gas is removed through an outlet in the vessel. Heat transfer apparatus is disposed about the vessel for removing the waste heat of reaction.

With this arrangement, hydrides may be hydrolyzed substantially at stoichiometry to provide hydrogen gas on demand to the fuel cell. The reaction is controlled and limited by the amount of water introduced to the vessel, so no excess water needs to be stored in the undersea vehicle. Additionally, the primary source of water for the generator may be the waste water produced by the fuel cell. Since this water is produced as the fuel cell is discharged, its weight and volume need not be accounted for. Further, since the hydride reacts readily with the water in its vicinity and no liquid free surface is present in the vessel to contact unreacted hydride, the generator is insensitive to attitude and can be operated at various angles of pitch and roll.

The vessel is sized to provide an optimally minimum weight and volume, to minimize the weight and volume of the undersea vehicle. A cylindrical chamber having hemispherically domed ends has been found to be suitable. Similarly, the hydride or hydride blend is chosen to minimize its weight and volume. $LiBH_4$ has been found to provide a minimal weight and volume per mole of hydride. Also, a blend of $LiBH_4$ with up to ten percent $CaH_2$ has been found to minimize undesirable clumping without adding undue weight and volume to the generator.

Also, the vessel and its contents may be maintained at temperatures and pressures conducive to hydrolysis of the hydride. Reaction products of some hydrides may under certain conditions, hydrate, or chemically bond to water. If such hydration occurs, water injected into the vessel for reaction with the hydride will instead be consumed by the product. This will reduce the amount of hydrogen generated from a preselected amount of hydride. Maintaining the reaction temperature above a predetermined temperature will prevent hydration of the reaction products, thereby minimizing the amount of water required to hydrolyze the hydrides.

Also, the hydrolysis reaction is exothermic. If the temperature rises above the melt temperature of the hydride, the hydride may begin to decompose and become unstable. The heat transfer apparatus allows the vessel to be maintained within a desired temperature range to preclude the hydration of the reaction products and the decomposition of the hydride. The apparatus for removing the waste heat of reaction may be provided, for example, as coils wrapped around the vessel through which a heat transfer fluid may be pumped. Thus the temperature of hydrolysis of the hydride may be controlled.

The stirrer apparatus may be provided, for example, as a ribbon or paddle blender which turns, stirring the contents of the vessel. Stirring distributes unreacted hydride to the vicinity of the water nozzles, so that the hydride may react with the water. Stirring also prevents clumping of the hydride and aids in conducting the heat of reaction to the heat transfer apparatus.

A motor coupled to the stirrer apparatus causes the stirrer to turn. The stirrer may be provided having a diameter which is substantially smaller than the inside diameter of the vessel. The stirrer axis of rotation is parallel to, but offset from, the axis of the vessel, and the stirrer slowly orbits the center of the vessel as it turns about its own axis. Alternatively, the stirrer may have a diameter corresponding to the diameter of the vessel and may rotate about the central axis of the vessel. The stirrer apparatus may also be provided having one or more apertures provided thereon. The apertures may act as injection points through which either liquid water or steam may be injected into the hydride.

In a further embodiment of the present invention, the vessel comprises a hydride storage chamber and a hydride reaction chamber. A slow speed feed screw moves hydride from the storage chamber into the reaction chamber through a passage. Reaction product and unreacted hydride are returned to the storage chamber via a further passage. Water is introduced into the reaction chamber for reaction with the hydride. A stirrer apparatus in the reaction chamber stirs the hydride for distribution with the water. Heat transfer apparatus surrounds both the reaction chamber and storage chamber to transfer the heat of reaction out of the vessel.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
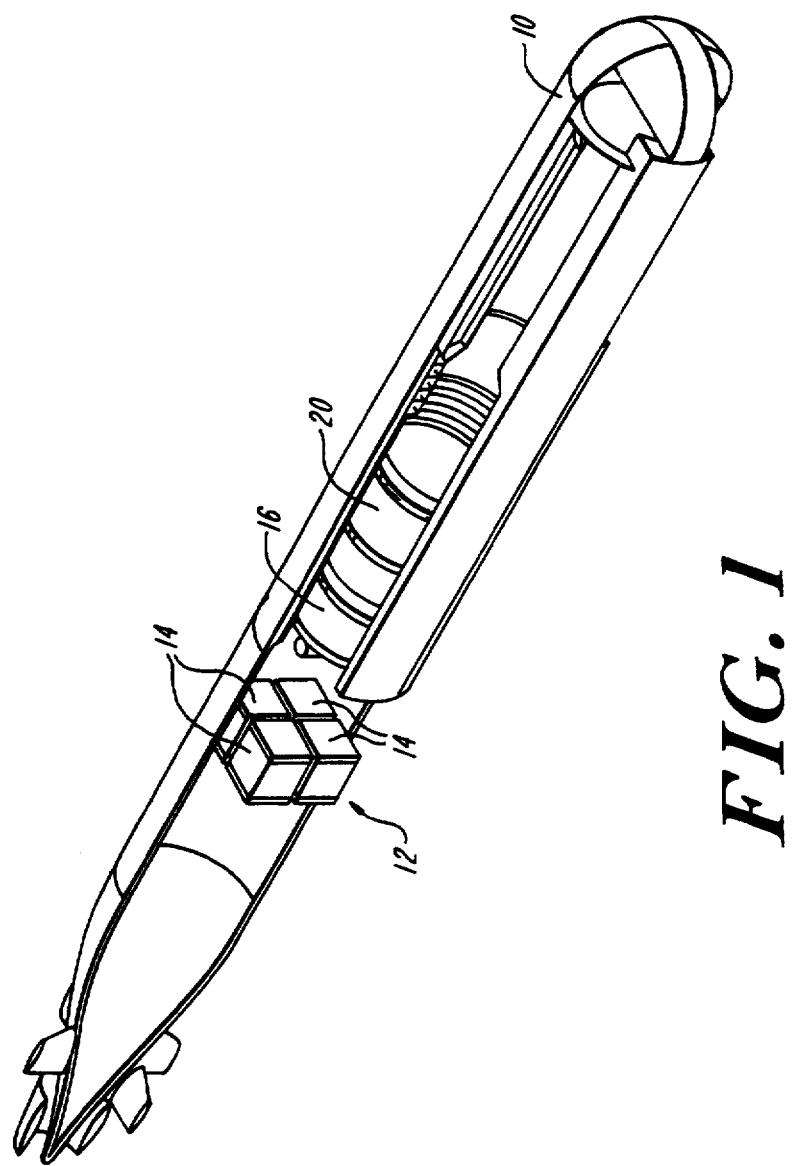
FIG. 1 is a partial, perspective view of an undersea vehicle incorporating a hydrogen generator according to the present invention.

An unmanned undersea vehicle (UUV) 10, powered by one or more fuel cells, is shown in FIG. 1. In the embodiment illustrated, a fuel cell assembly 12 comprising four fuel cell stacks 14 is provided. Each stack typically comprises four fuel cells connected in series. However, any suitable number of fuel cells arranged in any appropriate manner may be used, as determined by the UUV power requirements. The fuel cells generally are of the proton exchange membrane type, but any type of fuel cell which uses hydrogen gas, $H_2$, as a fuel may be provided. A hydrogen generator 16 according to the present invention, described below, and an oxygen source 20 are also provided. The source 20 of oxygen is connected via an oxygen supply line (not shown) to the fuel cell assembly 12 to supply the required amount of oxygen, $O_2$. For example, oxygen may be generated from solid compounds, such as chlorates, perchlorates, or superoxides, or from liquids such as hydrogen peroxide. Alternatively, liquid oxygen may be stored in appropriate tanks for supply to the fuel cell assembly.

Figure 2:
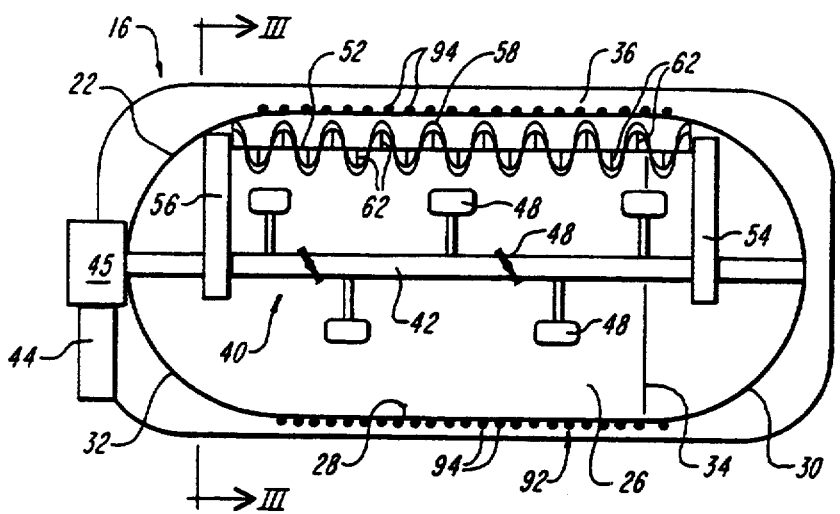
FIG. 2 is a schematic cross-sectional elevational view of an embodiment of the hydrogen generator of the present invention.
Figure 3:
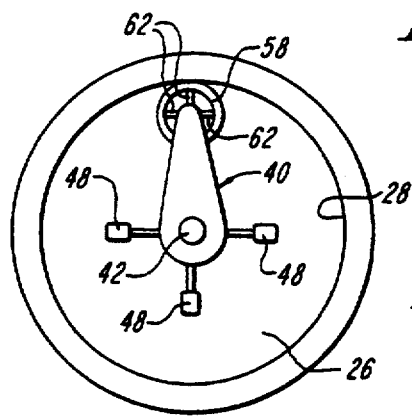
FIG. 3 is a schematic cross-sectional view along line III—III of FIG. 2.

A preferred embodiment of the hydrogen generator 20 is shown more particularly in FIGS. 2 and 3. The hydrogen generator comprises a sealable, pressurizable, thermally insulated vessel 22. The vessel comprises a cylindrically-walled portion 28 and rounded end closures 30, 32 defining a chamber 26. Preferably, the vessel is made from a corrosion resistant metal. At least one end closure 30 is formed as a separate member from the cylindrical portion 28 and is attached to the cylindrical portion along a sealed joint 34, described more fully below. The other rounded end closure 32 is formed as an integral piece with the cylindrical portion 28, although it could be formed as a separate piece suitably attached to the cylindrical portion along a sealed joint if desired. The chamber 26 is surrounded by a layer of insulation 36. Many known types of insulating material, such as spun glass wool, are suitable. The insulation prevents the heat generated by the reaction from affecting the environment surrounding the vessel 22 and allows excess heat to be removed in a controllable manner, to be more fully described below.

The chamber 26 of the vessel 22 is loaded with a hydride in a loose granular or pelletized form, which is readily obtainable from commercial sources. Hydrides are selected based on criteria such as weight, volume, stability, reactivity, and safety. Suitable hydrides are lithium borohydride, $LiBH_4$, calcium hydride, $CaH_2$, and lithium hydride, $LiH$, since they exhibit good thermal stability and are relatively unreactive, although other hydrides could be used if suitable account can be taken of factors such as stability and reactivity. Of these three hydrides, $LiBH_4$ is the preferred hydride, because it occupies the least volume relative to liquid hydrogen, LH2, and provides the least weight relative to LH2. Assuming a fifty percent packing density, a mole of $LiBH_4$ occupies 0.60 times the volume of a mole of LH2 and provides 2.72 times the weight of a mole of LH2. A mole of LiH occupies 1.10 times the volume of a mole of LH2 and provides 3.97 times the weight. A mole of $CaH_2$ occupies 1.13 times the volume of a mole of LH2 and provides 10.53 times the weight. A blend of hydrides may also be provided to provide enhanced mechanical properties, if desired. For example, it has been found that a hydride blend of $LiBH_4$ with up to approximately 10 percent $CaH_2$ is less prone to undesirable clumping of reaction products. Additionally, fine particles are preferable to coarse particles to maximize the surface area available for reaction with the water. $LiBH_4$ particles having a mesh size in the range of 40 to 80 have been found to be suitable.

Hydrides generally require careful handling, so the hydride or hydride blend is preferably loaded into the vessel 22 under controlled conditions outside of the undersea vehicle. The vessel 22 is then sealed by attaching the rounded end 30 to the cylindrical portion 28 along the sealed joint 34 and blanketed with the insulation 36. The vessel is then loaded into the undersea vehicle and attached to the fuel cell assembly and other peripheral equipment.

Figure 5:
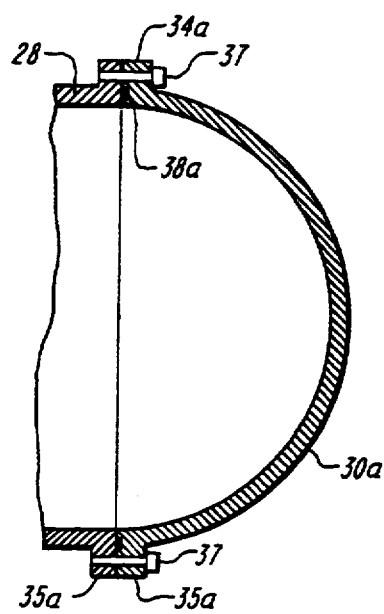
FIG. 5 is a cross-sectional view of one embodiment of an end closure and joint of the hydrogen generator according to the present invention.
Figure 6:
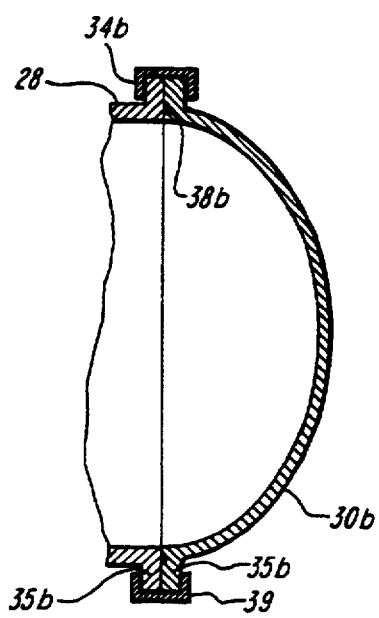
FIG. 6 is a further embodiment of an end closure and joint according to the present invention.
Figure 7:
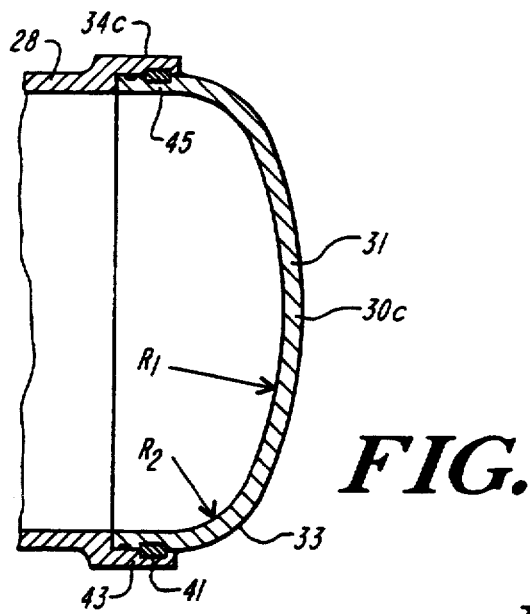
FIG. 7 is a still further embodiment of an end closure and joint according to the present invention.

The size and shape of the chamber 26 are designed to optimize weight efficiency per unit volume, volume efficiency per unit length, safety, and manufacturability. A cylindrically-walled portion having hemispherically domed end closures, as shown in FIG. 2, has been found to be satisfactory. FIGS. 5 and 6 show two end closures 30a and 30b which incorporate a domed configuration. FIG. 7 shows a further end closure 30c with a relatively flattened wall 31 having a radius of curvature $R_1$ and a relatively curved annular side wall 33 having a radius of curvature $R_2$ smaller than $R_1$.

FIGS. 5, 6, and 7 also show various configurations of the joint 34a, 34b, and 34c, respectively, between the end closure 30 and the cylindrical portion 28. In FIG. 5, the joint 34a comprises corresponding annular flanges 35a on the cylindrical portion 28 and the closure 30a. Bolts 37 or other suitable fasteners are provided at intervals to hold the flanges together. An O-ring 38a or other suitable sealing member is provided between the flanges. In FIG. 6, the joint 34b also comprises corresponding annular flanges 35b. The flanges are maintained in contact by a clamping device 39. An O-ring 38b or other suitable sealing member is provided between the flanges. FIG. 7 shows a slip spline joint 34c, in which a flexible metal spline or batten 41 is inserted into a circumferential groove in an outer collar 43 and corresponding inner collar 45. A tangential access hole (not shown) is provided in the outer collar 43 of the joint. An O-ring 38c or other suitable sealing member is provided between the collars 43 and 45. Any other suitable joint 8 may be used. Any joint may be used with any end closure. Alternatively, the end closure could be welded or otherwise permanently fixed to the cylindrical portion. A welded joint is acceptable if the generator were intended to be used only once and then discarded.

Returning to FIGS. 2 and 3, a stirring apparatus shown generally at 40 is disposed in the chamber 26 of the vessel 22. The stirring apparatus comprises a central shaft 42 and an orbital shaft 52. The central shaft extends the length of the chamber 26 from one rounded end to the other rounded end along the axis of the cylindrical portion. A drive motor 44 and gear box 45 mounted adjacent the integral end 32 and outside the chamber 26 are coupled to the shaft 42 via a sealed aperture in the integral end 32 to rotate the shaft 42. Preferably, the drive motor draws power from the fuel cell.

A processor or controller 46 is provided to monitor and control the hydrogen generator. The processor may be a device dedicated to the hydrogen generator, or it may be the UUV main processor, which monitors and controls the oxygen generator and fuel cell as well. The drive motor 44 is controllably coupled to the processor 46 via a communications line, shown as a dashed line in FIG. 4.

A plurality of paddles 48 extend out from the central shaft 42 at spaced intervals in a spiral formation. As the shaft 42 is rotated, the paddles gently move the granular hydride out of the core region of the chamber, thereby distributing the hydride to prevent clumping, move all the hydride into contact with the water to ensure that it is able to react, and provide better transfer of the heat of the reaction out of the vessel.

The orbital shaft 52 is mounted parallel to the central shaft 42 between two arms 54, 56 which extend from the central shaft 42. A stirrer 58, comprising a helical ribbon blender, is disposed along the length of the orbital shaft 52. Other types of stirrers or blenders, such as blades or paddles, may be provided if desired; however, a helical ribbon blender is generally more efficient per unit of power expended. The drive motor 44 and gear box 45 are also coupled to the orbital shaft to cause the shaft to rotate about its own axis at a relatively high speed and to rotate about the axis of the central shaft 42 at a slower speed. Preferably, the orbital shaft rotates about its own axis at a speed of 450 to 550 rpm, and preferably approximately 500 rpm, to stir a small volume of the hydride. The orbital shaft and the central shaft rotate about the central axis at a speed, determined by the generator discharge rate, to bring all of the hydride into contact with the introduced water in the area of the orbital shaft at least once during the operation of the fuel cell. Typically, this speed is in the range of three to five revolutions during the time required to discharge the generator completely. Preferably, all the rotations are maintained in continuous operation, so that the hydride is continually circulating within the chamber regardless of the rate of introduction of water. Continuous circulation aids in prevention of clumping of the reaction product.

Water injection ports or nozzles 62 extend perpendicularly at spaced intervals along the orbital shaft 52. Each injection port terminates at an aperture in the helical ribbon blender 58. A fluid supply line in communication with each port 62 extends down the middle of the orbital shaft 52, through one or both of the arms 54, 56, and through a portion of the central shaft 42 to an inlet in the vessel 22. The injection ports could be provided separately from the stirrer apparatus, rather than integral therewith, if desired; however, the ports should be located so that they do not interfere with the rotations of the stirrer apparatus for distribution of the hydride. Alternatively, water could be introduced into the chamber, for example, through capillary or drip tubes.

Figure 4:
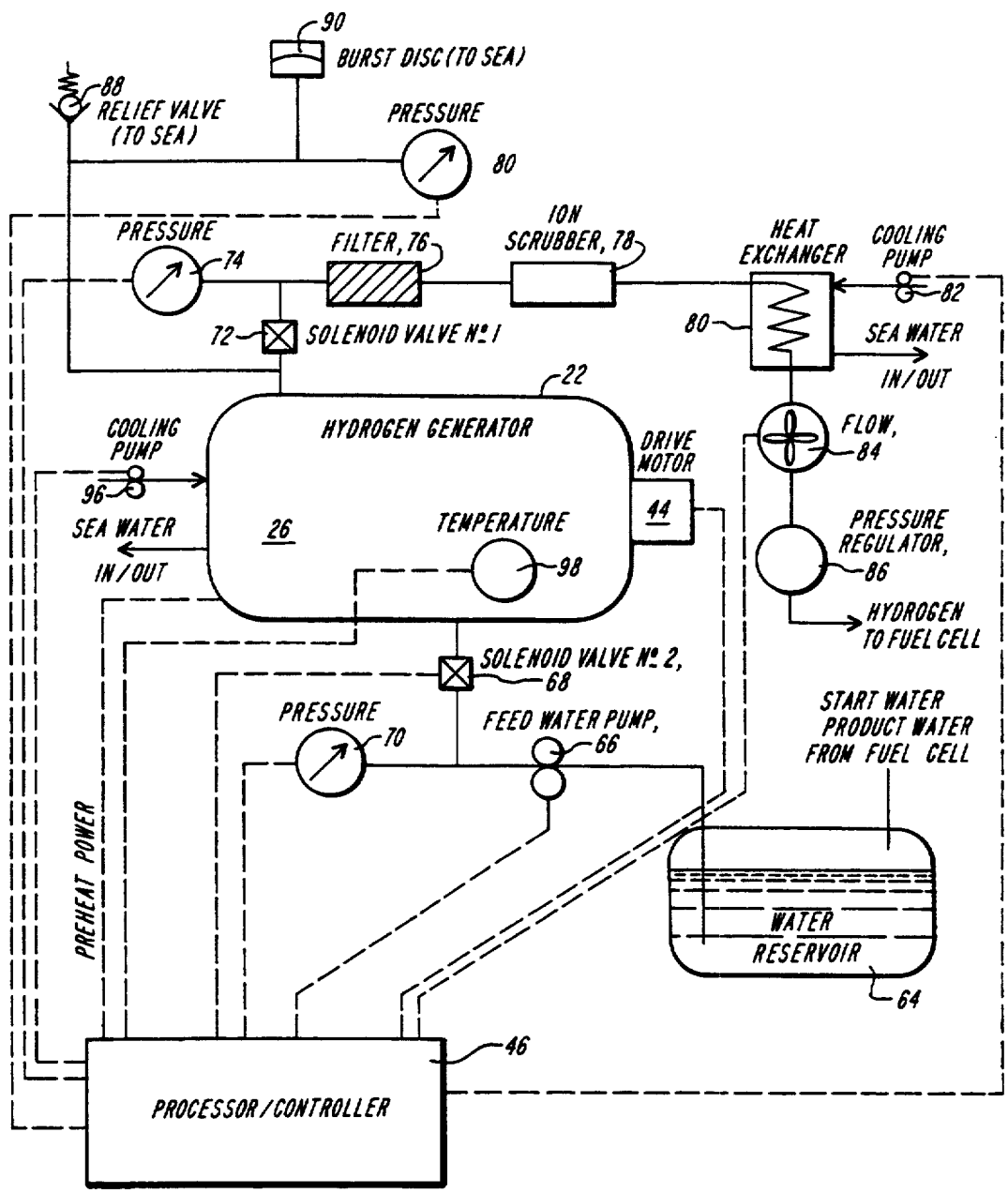
FIG. 4 is a schematic diagram of the hydrogen generation system of the present invention.

As best seen in the schematic diagram of FIG. 4, water, stored in a reservoir 64, is pumped along a feed line via a pump 66 through a valve 68, controlled by the processor 46, into the hydride-filled chamber 26 at the injection ports 62. Pressure in the feed line is monitored by a pressure gage 70 in communication with the processor 46. If desired, a heater could also be provided in the water feed line to generate steam for injection into the chamber. Steam provides a higher volume flow rate, which improves the agitation and stirring of the hydride within the chamber. Preferably, the heater would be heated by the waste heat from the reaction vessel, although it could also be powered electrically if desired.

A supply of start-up water is initially loaded into the reservoir 64 to begin the hydrolysis reaction. However, a byproduct from the fuel cell is water. Thus, once the fuel cell begins producing power, water from the fuel cell is transported to the reservoir 64 for use by the generator. Thus, the fuel cell is able to supply substantially all of the water required by the generator, minimizing the weight and volume needed for water storage in the UUV. Since the water is produced by the fuel cell as the hydrogen generator discharges, the weight and volume of this water do not have to be accounted for in the overall weight and volume of the hydrogen generator.

The hydride in the vicinity of the ribbon blender 58 reacts with the liquid water or steam to generate hydrogen, $H_2$. Since the water reacts readily with the hydride in the vicinity of the water ports as soon as the water is introduced, the generator is insensitive to inclination. Concurrently with the introduction of the water into the chamber 26, the drive motor 44 causes the orbital shaft 52 to rotate about its own axis and about the central shaft. The rotations of the orbital shaft cause the water to be distributed to unreacted hydride, thereby maintaining a controllable production of hydrogen and preventing clumping. The rotations also cause the heat of reaction to be dispersed throughout the entire mass of hydride and reaction product, so that the heat is readily conducted to the walls of the chamber for transfer away from the vessel, to be more fully described below.

The generated hydrogen is drawn off through a valve 72 in a hydrogen supply line in communication with the fuel cell assembly. Pressure in the supply line is monitored by a pressure gage 74, in communication with the processor 46. A filter 76 in the hydrogen supply line removes fine particulates of hydride or hydride reaction product from the gas stream. An ion scrubber 78 is preferably provided to remove ions such as $Cl^-$ which may be detrimental to the membrane and electrodes of the fuel cell. A heat exchanger 80 cools the hydrogen to the desired temperature for use in the fuel cells. The heat exchanger cooling fluid may advantageously be sea water pumped via a pump 82 in heat exchange relationship with the hydrogen. If desired, the heated sea water may be used for other purposes, such as to heat the feed water to steam for introduction into the hydrogen generator or to preheat the hydride within the generator. A flow meter 84 and pressure regulator 86 are also provided for controlled introduction of the hydrogen into the fuel cell as is known in the art.

The reaction in the hydrogen generator is controlled by the demand for electrical power from the fuel cell. The more power produced by the fuel cell, the more hydrogen demanded by the fuel cell from the hydrogen generator. The rate of production of hydrogen is controlled by the rate of introduction of water into the chamber 26. Typically, water is supplied to the chamber at a rate of approximately 4.5 ml/min per 1 kW of electrical power produced by the fuel cell, based on a fuel cell efficiency of approximately 60 percent. If more hydrogen is required by the fuel cell, more water may be introduced into the chamber. If less hydrogen is required, the supply of water into the chamber may be reduced or stopped by the processor to prevent the generation of excess hydrogen. However, if more hydrogen has been produced than is immediately required by the fuel cell, the hydrogen may be stored in the interstices of the granular hydride in the chamber until needed. The storage of hydrogen in the interstices can readily accommodate power transients at the fuel cell.

Referring again to FIG. 2, a thermal transfer apparatus 92 is disposed about the vessel for removing the waste heat of reaction. The thermal transfer apparatus comprises coils 94 wrapped around the cylindrical portion 28 of the chamber 26. A heat transfer fluid is pumped through the coils. Preferably, the heat transfer fluid comprises sea water, which is readily available. Other suitable fluids may be used if desired; in this case, a reservoir or other storage facility would have to be provided for the fluid.

As shown in FIG. 4, the sea water, or other fluid, is pumped along an intake line via a pump 96. The sea water passes through the coils 94 surrounding the chamber 26, whereby the heat inside the chamber generated by the reaction is transferred to the sea water in the coils. Placing the stirrer 58 close to the walls of the chamber also ensures that the heat of reaction is produced close to the heat transfer surface. The sea water is returned via an output line to the sea. One or more temperature gages 98, in communication with the processor 46, are provided inside the chamber to monitor the temperature. The temperature of the hydrolysis reaction of the hydride is controlled by controlling the rate of flow of the heat transfer fluid through the coils 94.

Reaction products of some hydrides, such as LiBH$_4$ and LiH, may under certain conditions hydrate, or chemically bond to water. If such action occurs, water injected into the vessel for reaction with the hydride may instead be consumed by the product. This may reduce the amount of hydrogen generated from a preselected amount of water. Also, the hydrates deprive unreacted hydride of the water needed for hydrolysis. In systems using hydrides that produce exactly as much water as is theoretically needed, for example, LiH and CaH$_2$, additional water would have to be stored in the UUV. Further, if hydrates were present in the chamber 26, an increase in temperature that spanned the temperature of dehydration could liberate the water in the hydrate. The liberated water would react with the hydride, precluding control of the hydrogen generation. Thus, maintaining the reaction temperature above a predetermined minimum temperature may prevent hydration of the reaction products.

Preferably, the temperature inside the vessel should remain in a range above the temperature at which hydration of reaction products occurs and below the melt temperature of the hydride. The actual temperature range depends on the particular hydride used. For example, for LiBH$_4$, the preferred temperature range is between 175° C. and 250° C., with approximately 200° C. being the optimum temperature. At room temperature, LiBH$_4$ dissolves in water and will react only very slowly. At a temperature below approximately 150° C., hydration of the reaction product occurs as follows:

$$LiBH_4 + 4H_2O \rightarrow LiBO_2 \cdot 2H_2O + 4H_2.$$

At approximately 270° C., LiBH$_4$ melts; above the melt temperature, LiBH$_4$ begins to decompose, and above 380° C., it decomposes rapidly. Although the heat of fusion of LiBH$_4$ is substantial, which tends to prevent the temperature from rising into the higher unsafe regions, nevertheless, the hydrolysis reaction is exothermic and the temperature in the chamber would soon rise above 270° C. if a coolant were not circulated around the chamber to transfer the heat away. Thus, it is preferable to control the temperature to remain below the melt temperature.

During start-up, it is desirable to preheat the hydride in the chamber to within the preferred reaction temperature range. The preheating may be provided by heating the fluid circulating through the coils 96. The fluid may be temporarily diverted to a preheater for this purpose. Once the desired temperature is reached, the fluid is no longer diverted to the preheater, so that it can be used for its cooling purpose, as discussed above. Alternatively, resistance heating elements may be provided about the chamber 26. stirring of the hydride during preheating by rotation of the central and orbital shafts also aids in heat distribution and shortens the preheating time.

As also shown in FIG. 4, the pressure inside the chamber 26 is monitored by a pressure gage 80 in communication with the processor 46. A nominal operating pressure of approximately 200 psig, ±50 psig, has been found to be satisfactory. The pressure should be great enough to ensure a high concentration of water vapor in the chamber, since an increase in the concentration of the reactants increases the reaction rate. If the pressure drops too low, water may be introduced into the chamber to react with the hydride, thereby generating additional hydrogen, to increase the pressure. The pressure is constrained at the upper end of its range by the design of the generator and the UUV. A suitable pressure relief valve 88 and burst disc 90 to sea are provided for relief of excess pressure, as is known in the art.

During operation, reaction products can accumulate at the aperture of the injection ports in the ribbon blender of the stirrer 58 and block the flow of water. This accumulation can be continually scraped away by mounting the helical ribbon blender sufficiently close to the chamber walls. Alternatively, if blades or paddles are provided on the stirrer 58, stator blades could be fixed to the walls to mesh with the stirrer blades as the stirrer blades passed.

Figure 11:
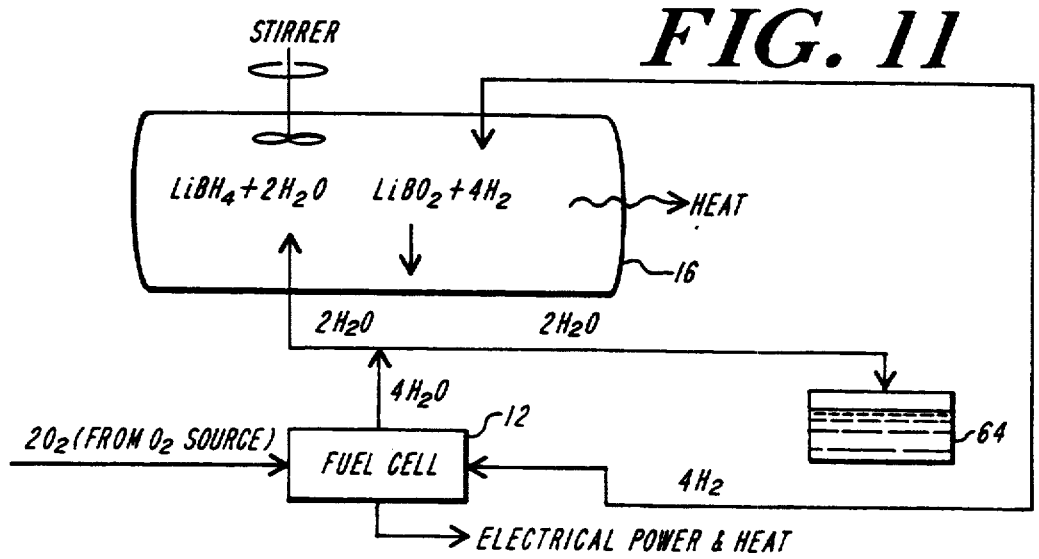
FIG. 11 is a schematic representation of a hydrolysis reaction for an undersea vehicle according to the present invention.

An example of a hydrolysis reaction using LiBH$_4$ in the hydrogen generator of the present invention to produce hydrogen for a UUV fuel cell is shown schematically in FIG. 11. In the present invention, the rate of production of the hydrogen is controlled by the rate at which water is introduced into the hydride, so that the hydride may be hydrolyzed substantially at stoichiometry to produce hydrogen gas on demand for the fuel cell. Since the hydride in the vicinity of the introduced water reacts readily with that water, the generator is insensitive to inclination. The vessel and its contents are maintained at temperatures conducive to hydrolysis of the hydride, which minimizes the amount of water required to hydrolyze the hydrides by avoiding hydration of the reaction products. Additionally, as can be seen in FIG. 11, the waste water produced by the fuel cell can constitute the primary source of water for the generator. Since this water is produced as the hydrogen generator is discharged, its weight and volume need not be accounted for in the design of the hydrogen generator.

Figure 8:
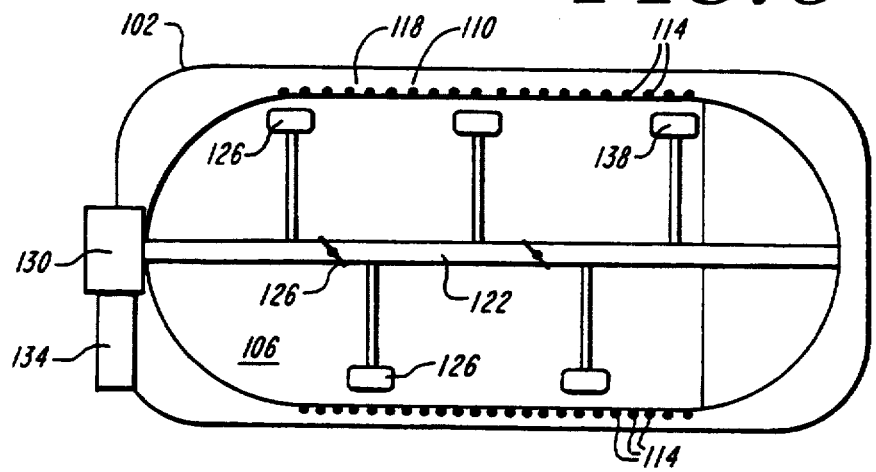
FIG. 8 is a schematic cross-sectional elevational view of a further embodiment of the hydrogen generator of the present invention.

A further embodiment of the hydrogen generator is shown in FIG. 8. This embodiment incorporates a simpler stirrer apparatus, with may be suitable for some applications. As with the embodiment shown in FIGS. 2 and 3, the generator comprises a sealable, pressurizable, thermally insulated vessel 102. Hydride is loaded into a chamber 106 in the vessel. A heat transfer apparatus 110 comprising a coil 114 through which a thermal transfer fluid is circulated, is disposed about the chamber 106. Insulation 118 surrounds the chamber and heat transfer apparatus.

The stirrer apparatus comprises a single central shaft 122 about which are disposed blades or paddles 126 at spaced intervals. The blades are shown in a spiral configuration, although other configurations may be used if desired. Similarly, the blades are shown having the same length, although varied lengths could be used if desired. The central shaft 122 is driven by a drive motor 130 and gear assembly 134. The motor 130 is in communication with the processor 46 as previously described with reference to FIG. 4. Water ports 138 are provided in each blade. Water is introduced through the ports 138, in a manner as described previously, for reaction with the hydride to generate hydrogen. Control of the generator of FIG. 8 is substantially as described above.

Figure 9:
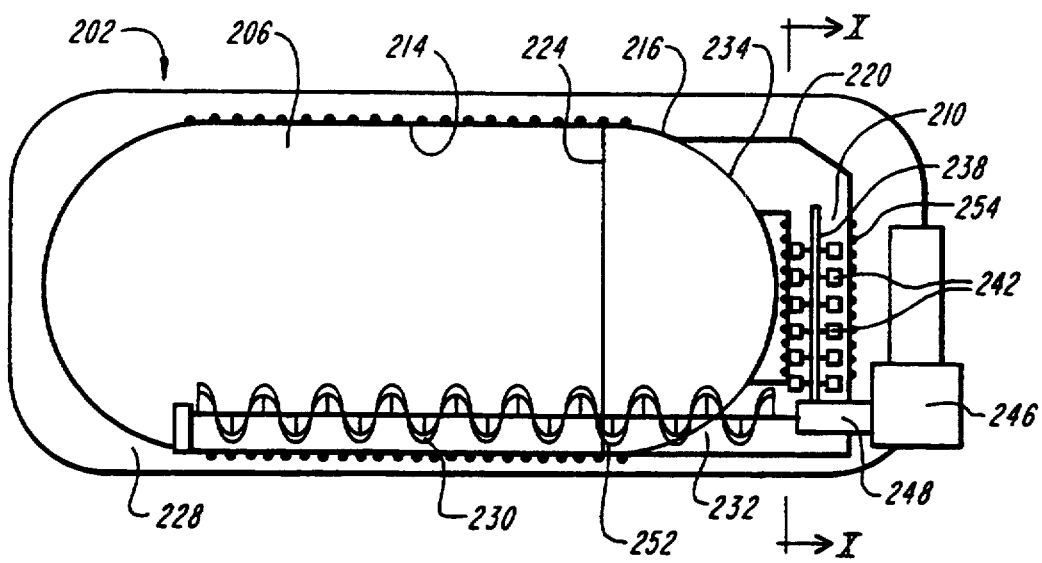
FIG. 9 is a schematic cross-sectional elevational view of a still further embodiment of the hydrogen generator of the present invention.
Figure 10:
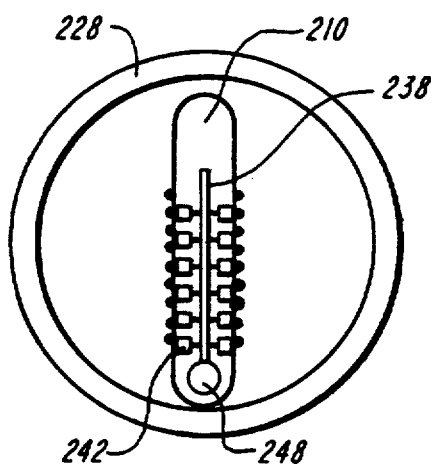
FIG. 10 is a schematic cross-sectional view along line X—X of FIG. 9.

A still further embodiment of the hydrogen generator according to the present invention is shown in FIGS. 9 and 10. As with the embodiment shown in FIGS. 2 and 3, the generator comprises a sealable, pressurizable, thermally insulated vessel 202. The vessel comprises a hydride storage chamber 206 and a hydride reaction chamber 210. The storage chamber 206 is defined by a cylindrically-walled portion 214 and rounded end closures 216, 218. The reaction chamber is defined by an extension 220 of the end closure 216. The end closure may be formed as a separate member and attached to the cylindrically-walled portion along a sealed joint 224 as previously described. Insulation 228 surrounds the storage chamber and reaction chamber.

A hydride or hydride blend is loaded into the storage chamber and reaction chamber and the vessel is sealed along the joint 224. A low-speed feed screw 230 moves hydride from the storage chamber 206 into the reaction chamber through an opening 232. Reaction products and unreacted hydride are returned to the storage chamber through an opening 234. In the reaction chamber, a high-speed stirrer 238 from which blades or paddles 242 extend at intervals, stirs the hydride. The high-speed stirrer rotates at a rate of approximately 500 rpm. Both the high-speed stirrer and the low-speed feed screw are controlled by a drive motor 246 and gear assembly 248 in any manner known in the art. Water ports extend through the blades 242 and terminate at an aperture in each blade tip as described above. Hydride in the reaction chamber 210 reacts with the injected water to produce hydrogen gas, which is removed and supplied to the fuel cell as discussed above. The slow-speed feed screw 230 rotates at a speed designed to circulate at least the stoichiometric quantity, and preferably slightly more than the stoichiometric quantity, of hydride through the reaction chamber during the time required for the fuel cell to discharge. Thus, the entire mass of hydride passes at least once through the reaction chamber 210.

Heat transfer apparatus, comprising coils 252, 254 through which a coolant fluid is circulated, surrounds both the storage chamber 206 and the reaction chamber 210. Coolant fluid circulated through the coils allows the temperature within the vessel to be controlled, as discussed above. The embodiment of FIGS. 9 and 10 is useful in preventing the migration of water beyond the vicinity of the high-speed stirrer where it could form large chunks of reaction product which subsequently bind the stirrer.

Having described Preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

We claim:

1. A hydrogen generator for generation of hydrogen gas by a substantially stoichiometric hydrolysis reaction between water and a hydride, said generator comprising:
    a vessel having a chamber therein for containing a hydride, said vessel having a sealable closure on at least one end;
    heat transfer apparatus disposed about a surface of said vessel for controlling the temperature of a hydrolysis reaction within said chamber;
    a stirring apparatus disposed within said vessel for stirring the hydride within said chamber;
    water input ports, in communication with a water source, said water input ports disposed at spaced intervals within said chamber for introducing water into said chamber for reaction with the hydride, whereby the hydride reacts with the water in a vicinity of the water ports to generate hydrogen gas; and
    an output port for removing hydrogen gas from the vessel.

2. The hydrogen generator of claim 1 wherein said heat transfer apparatus comprises at least one coil disposed about the vessel.

3. The hydrogen generator of claim 2 further comprising a heat transfer fluid in said at least one coil.

4. The hydrogen generator of claim 3, wherein the heat transfer fluid comprises sea water.

5. The hydrogen generator of claim 1, further comprising thermal insulation enclosing and surrounding said vessel.

6. The hydrogen generator of claim 1 wherein said water ports comprise apertures in said stirring apparatus.

7. The hydrogen generator of claim 1 wherein said water ports comprise injection nozzles.

8. The hydrogen generator of claim 7 wherein said injection nozzles are located in said stirring apparatus.

9. The hydrogen generator of claim 1 wherein said water ports comprise capillary tubes.

10. The hydrogen generator of claim 9 wherein said capillary tubes are located within said stirring apparatus.

11. The hydrogen generator of claim 1 wherein said stirring apparatus comprises a helical ribbon blender.

12. The hydrogen generator of claim 1 wherein said stirring apparatus comprises a paddle blender.

13. The hydrogen generator of claim 1 wherein said stirring apparatus comprises a central shaft mounted for rotation about a central axis of said vessel and paddles extending at spaced locations from said central shaft.

14. The hydrogen generator of claim 12, wherein said stirring apparatus has a diameter corresponding to the diameter of the vessel.

15. The hydrogen generator of claim 1, wherein said stirring apparatus comprises a central shaft mounted for rotation about a central axis of said vessel and an orbital shaft mounted for orbital rotation about and offset a distance from the central axis.

16. The hydrogen generator of claim 15, wherein said stirring apparatus further comprises a helical ribbon blender mounted for rotation about said orbital shaft.

17. The hydrogen generator of claim 16, wherein said stirring apparatus further comprises paddles extending at spaced locations from said central shaft.

18. The hydrogen generator of claim 1 wherein said stirring apparatus is mounted within said vessel to run sufficiently close to a wall of said vessel to scrape accumulated reaction product off of said stirring apparatus by contact with the wall of said vessel.

19. The hydrogen generator of claim 1 further comprising a motor mounted to drive said stirring apparatus.

20. The hydrogen generator of claim 1, further comprising a controller in communication with a water source for introducing water at a controlled rate to said water ports.

21. The hydrogen generator of claim 20, wherein said controller is in further communication with said heat transfer apparatus for conducting heat at a controlled rate via said heat transfer apparatus to maintain the temperature within said chamber within a predetermined range.

22. The hydrogen generator of claim 21, further comprising a temperature gage within said vessel, said temperature gage in communication with said controller for monitoring the temperature within said chamber.

23. The hydrogen generator of claim 20, wherein said controller is further in communication with said stirring apparatus for controlling the stirring apparatus.

24. The hydrogen generator of claim 1, wherein said vessel comprises a cylindrical enclosure having dome-shaped ends.

25. The hydrogen generator of claim 1, further comprising at least one hydride substantially filling said vessel, whereby the rate of reaction is controlled by the rate of introduction of the water into the vessel.

26. The hydrogen generator of claim 25, wherein said at least one hydride comprises at least one of lithium borohydride, calcium hydride, or lithium hydride.

27. The hydrogen generator of claim 25, wherein said at least one hydride comprises a blend of calcium hydride and lithium borohydride.

28. The hydrogen generator of claim 27, wherein said calcium hydride comprises at least 8 percent by weight of said blend.

29. The hydrogen generator of claim 1, wherein:
said chamber further comprises a storage chamber and a reaction chamber;
said stirring apparatus comprises a feed apparatus for transferring the hydride from said storage chamber to said reaction chamber; and
said water ports are disposed in said reaction chamber.

30. The hydrogen generator of claim 29, wherein said stirring apparatus further comprises a stirrer in said reaction chamber.

31. The hydrogen generator of claim 30, wherein said water ports are disposed in said stirrer in said reaction chamber.

32. The hydrogen generator of claim 1, further comprising a sealed joint for maintaining said closure in sealing engagement on said vessel.

33. A hydrogen generator for generation of hydrogen gas by a substantially stoichiometric hydrolysis reaction between water and hydride for use with a fuel cell, said generator comprising:
a vessel having a chamber therein, said vessel having a sealable closure on at least one end;
a hydride in a granular form disposed within said chamber;
heat transfer apparatus disposed about a surface of said vessel for controlling the temperature of a hydrolysis reaction within said chamber;
a stirring apparatus disposed within said vessel for stirring said hydride within said chamber;
water input ports disposed at spaced intervals within said chamber for introducing water into said chamber for reaction with said hydride, whereby said hydride reacts with the water in a vicinity of the water ports to generate hydrogen gas;
a water source in fluid communication with said water ports for supplying water to said water ports;
an output port for removing hydrogen gas from said vessel; and
a controller in communication with said heat transfer apparatus, said stirring apparatus, and said water source for introducing water at a controlled rate into said chamber for reaction with said hydride within a predetermined temperature range, whereby the rate of the hydrolysis reaction is controlled by the rate of introduction of the water into said chamber.

34. The hydrogen generator of claim 33, wherein said water ports are disposed in said stirring apparatus.

35. The hydrogen generator of claim 33, wherein said hydride comprises at least one of lithium borohydride, calcium hydride, or lithium hydride.

36. The hydrogen generator of claim 33, wherein said hydride comprises a blend of calcium hydride and lithium borohydride.

37. The hydrogen generator of claim 36, wherein, said blend comprises at least 8 percent by weight calcium hydride.

38. The hydrogen generator of claim 33, wherein said hydride has a particle size smaller than a 40 mesh sieve.

39. The hydrogen generator of claim 33, wherein said hydride substantially fills said chamber.

40. The hydrogen generator of claim 33, wherein said controller is in communication with said heat transfer apparatus to maintain the temperature within said vessel above the dehydration temperature of said hydride within said chamber.

41. The hydrogen generator of claim 33, wherein said controller is in communication with said heat transfer apparatus to maintain the temperature within said vessel below the melt temperature of said hydride within said chamber.

42. The hydrogen generator of claim 33, wherein said controller is in communication with said water source to introduce no more than a stoichiometric amount of water into said chamber for reaction with said hydride.

43. The hydrogen generator of claim 33, wherein said controller is in communication with said water source to introduce water into said chamber at a rate in response to a demand for hydrogen gas.

44. The hydrogen generator of claim 33, wherein said controller is in communication with said water source to introduce water into said chamber to maintain pressure within said chamber within a range of 150 to 250 psig.

45. An energy system for an undersea vehicle comprising:
a fuel cell for generating electrical power and water from hydrogen gas and oxygen gas;
a connection from a source of oxygen gas to the fuel cell;
a hydrogen generator operatively coupled to said fuel cell for generation of hydrogen gas by a substantially stoichiometric hydrolysis reaction between water and a hydride, said generator comprising:
a vessel having a chamber therein, said vessel having a sealable closure on at least one end;
a hydride in a granular form disposed within said chamber;
a stirring apparatus disposed within said vessel for stirring said hydride within said chamber;
water input ports disposed at spaced intervals within said chamber for introducing water into said chamber for reaction with said hydride in a vicinity of said water ports;
an output port in communication with said fuel cell for removing hydrogen gas from said vessel and directing said hydrogen gas to said fuel cell along a hydrogen gas flow path; and
a controller in communication with said fuel cell and said hydrogen generator for controllably introducing the water into said chamber through said water ports for reaction substantially at stoichiometry with said hydride.

46. The energy system of claim 45, wherein said hydrogen generator further comprises heat transfer apparatus disposed about a surface of said vessel for controlling the temperature of the hydrolysis reaction within said chamber.

47. The energy system of claim 46, further comprising a temperature gage in said vessel in communication with said controller for monitoring the temperature within said chamber, and wherein said controller is further operative to maintain the temperature above the dehydration temperature of said hydride.

48. The energy system of claim 47, wherein said controller is further operative to maintain the temperature below the melt temperature of said hydride.

49. The energy system of claim 45, wherein said controller is in communication with said fuel cell for determining demand for hydrogen gas at said fuel cell, and said controller is further operative to control the introduction of the water into said vessel through said water ports to control the rate of the hydrolysis reaction within said vessel to produce hydrogen gas to satisfy the demand at said fuel cell.

50. The energy system of claim 45, further comprising a water reservoir in fluid communication with said water ports for supplying water to said water ports.

51. The energy system of claim 45, further comprising a fluid path from said fuel cell to said water ports of said hydrogen generator, whereby the water produced by said fuel cell is introduced into said hydrogen generator for reaction with said hydride.

52. The energy system of claim 51, further comprising a heater disposed along said fluid path to heat the water to produce steam for introduction into said hydrogen generator.

53. The energy system of claim 45, wherein said heat transfer apparatus comprises at least one coil disposed about the vessel.

54. The energy system of claim 53, further comprising a heat transfer fluid in said at least one coil.

55. The energy system of claim 54, wherein the heat transfer fluid comprises sea water.

56. The energy system of claim 45, wherein said hydride comprises at least one of lithium borohydride, calcium hydride, or lithium hydride.

57. The energy system of claim 45, wherein said hydride comprises a blend of calcium hydride and lithium borohydride.

58. The energy system of claim 57, wherein said blend comprises at least 8 percent by weight calcium hydride.

59. The energy system of claim 45, wherein said hydride has a particle size smaller than a 40 mesh sieve.

60. The energy system of claim 45, further comprising thermal insulation enclosing and surrounding said vessel.

61. The energy system of claim 45, wherein said water ports are disposed in said stirring apparatus.

62. The energy system of claim 45, further comprising a pressure relief valve disposed in communication with said chamber.

63. The energy system of claim 45, further comprising a filter for removing particulates along the hydrogen flow path between said hydrogen generator and said fuel cell.

64. The energy system of claim 45, further comprising an ion scrubber along the hydrogen flow path between said hydrogen generator and said fuel cell.

65. The energy system of claim 45, further comprising a heat exchanger along the hydrogen flow path between said hydrogen generator and said fuel cell.

66. The energy system of claim 45, further comprising a pressure gage operatively connected to said vessel to indicate the pressure within said vessel, said pressure gage in communication with said controller for monitoring the pressure within said chamber.

67. The energy system of claim 66, wherein said controller is further operative to maintain the pressure within said chamber between 150 and 250 psig.

68. The hydrogen generator of claim 2 further comprising a pump for pumping a heat transfer fluid through said at least one coil.

69. The energy system of claim 53, further comprising a pump for pumping a heat transfer fluid through said at least one coil.

* * * * *